May 9, 1944.  R. O. MANSPEAKER  2,348,400
DISPENSING MECHANISM
Filed Oct. 6, 1941  3 Sheets-Sheet 2
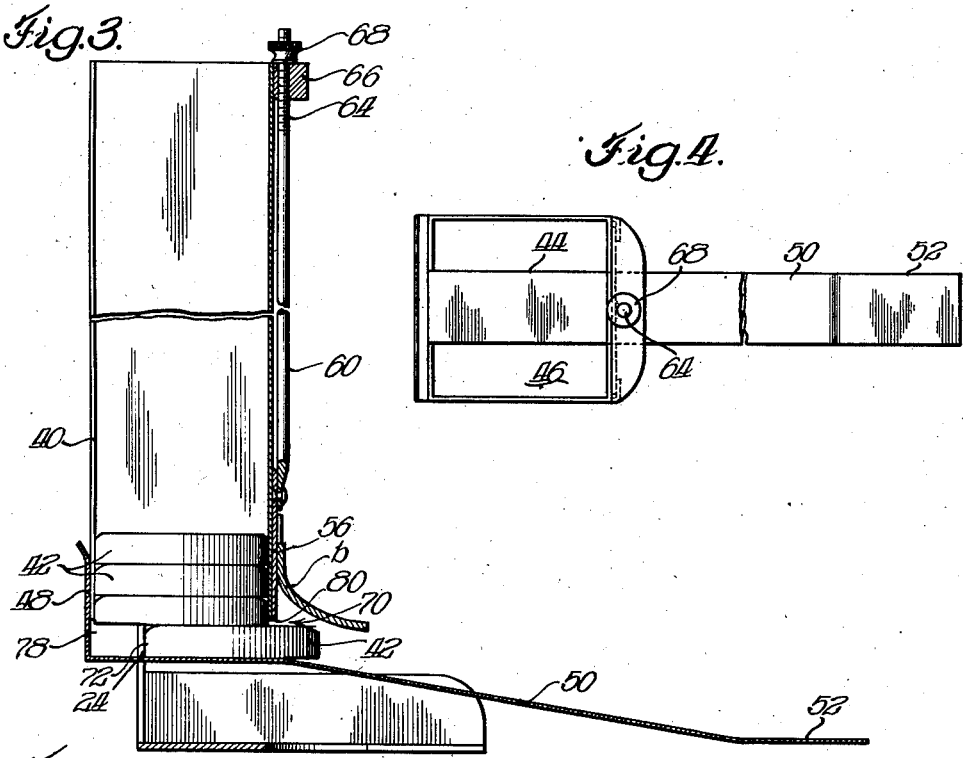
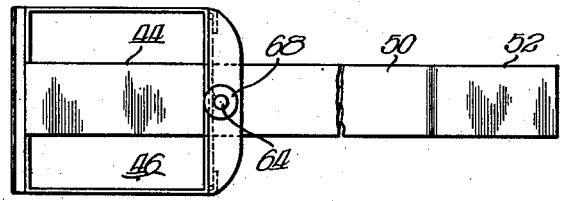
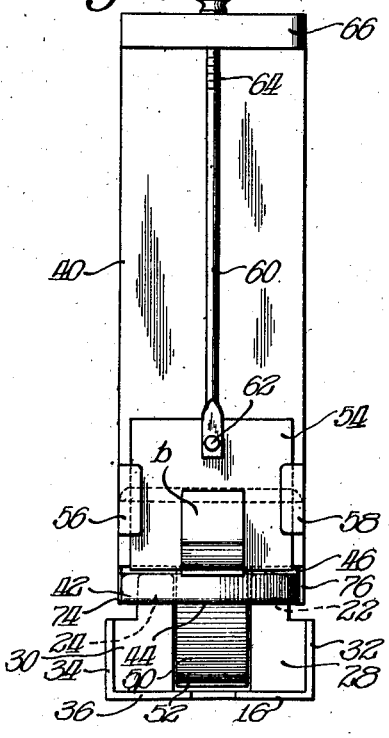
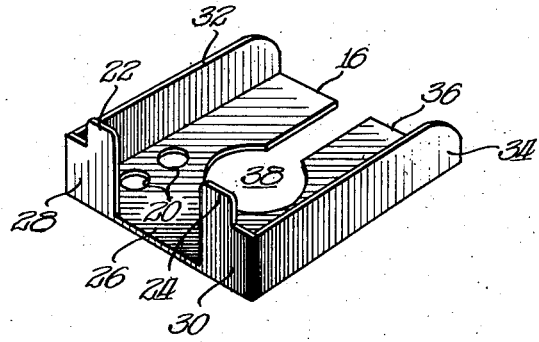
INVENTOR.
Robert O. Manspeaker
BY
ATTORNEYS May 9, 1944.   R. O. MANSPEAKER   2,348,400
DISPENSING MECHANISM
Filed Oct. 6, 1941   3 Sheets-Sheet 3
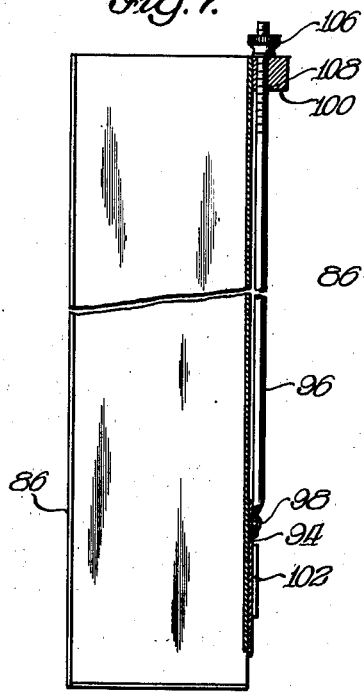
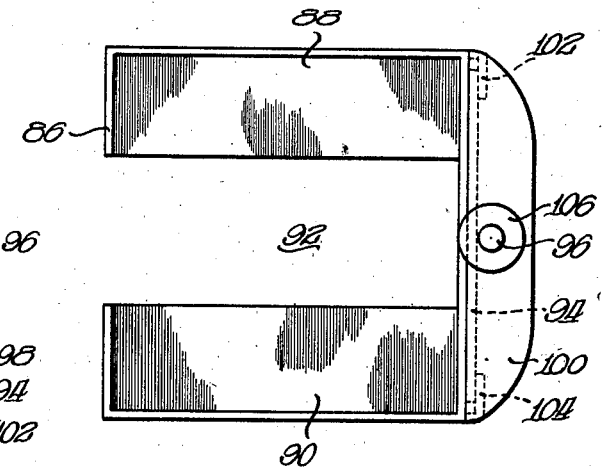
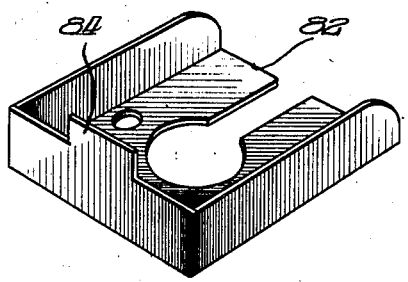
INVENTOR.
Robert O. Manspeaker
BY
ATTORNEYS Patented May 9, 1944

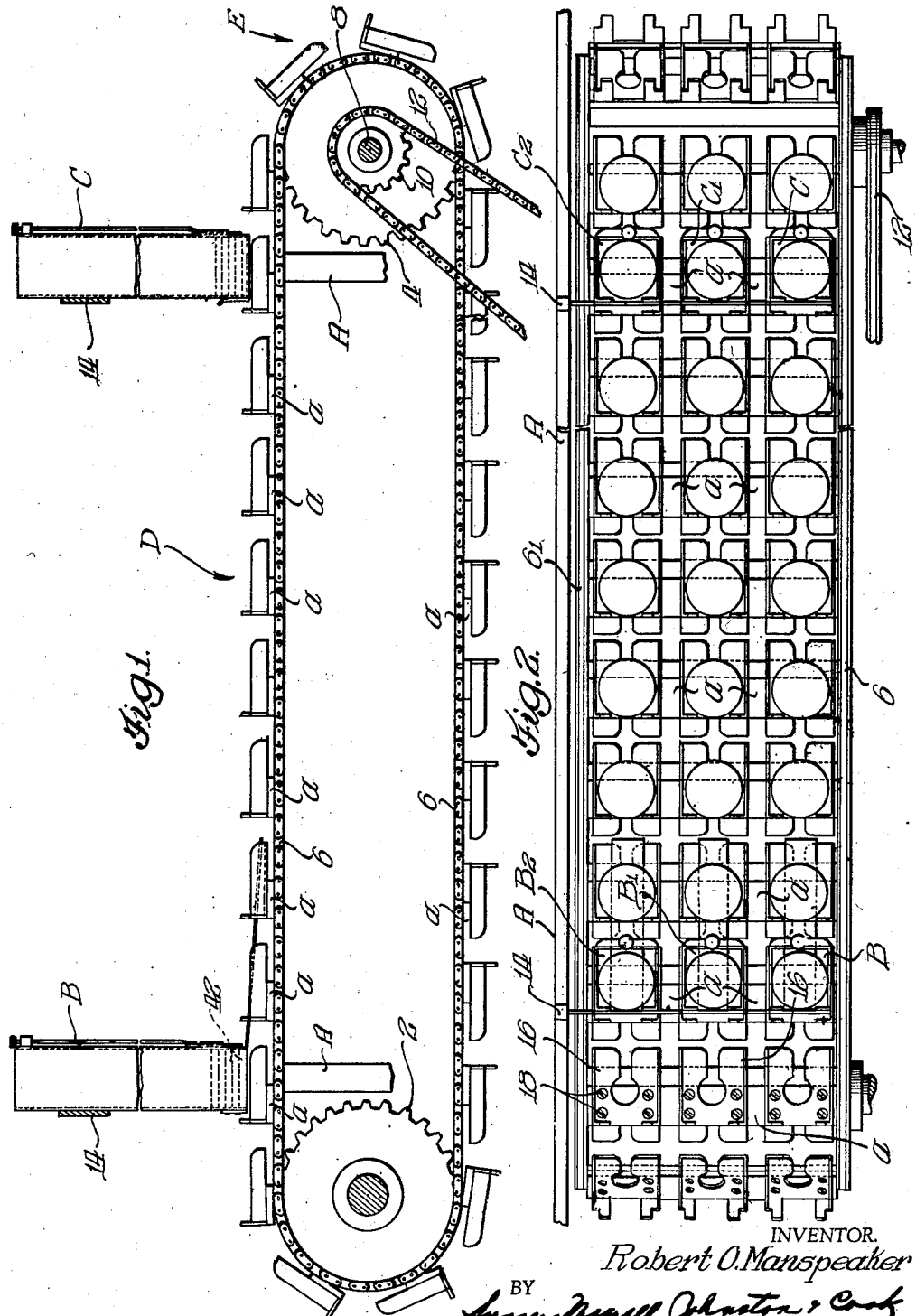

2,348,400

UNITED STATES PATENT OFFICE 2,348,400

DISPENSING MECHANISM

Robert O. Manspeaker, Chicago, Ill.

Application October 6, 1941, Serial No. 413,763

4 Claims. (Cl. 214—8.5)

This invention relates to an apparatus or mechanism for dispensing articles from a stack thereof, and more particularly to a device for dispensing articles in association with a moving conveyor system.

One of the objects of the invention is to provide a new and improved type of dispensing mechanism.

Another object of the invention is to provide a new and improved type of conveyor dispensing mechanism whereby articles are removed from the bottom of a stack onto a conveyor system, one at a time.

Another object of the invention is to provide a multiple dispensing system in conjunction with a conveyor mechanism whereby one or more articles may be removed from stacks thereof and disposed one on top of the other in a predetermined relationship.

A more specific object of the invention is to provide a new and improved apparatus for making sandwich cookies or similar pastries, wherein a wafer is supplied to a moving conveyor system, a filling is applied to the wafer and a second wafer is superposed upon the first wafer, all of said operations taking place in conjunction with a moving conveyor system.

Another specific object of the invention is to provide a new and improved type of apparatus for making sandwich or filled cookies or pastries in multiple units from the same conveyor system.

Still a further object of the invention is to provide a dispensing mechanism for removing cookies, wafers or other articles from the bottom of a stack thereof onto a moving conveyor system, while at the same time providing means for centering said cookies, wafers or other articles.

Still another specific object of the invention is to provide a new and improved device of the character described which may be adapted for use with cookies, wafers or other articles of different thicknesses by a simple adjustment.

Other objects and advantages of the invention will be apparent by reference to the following description in conjunction with the accompanying drawings, in which, Figure 1 is an elevational view of a conveyor system in association with a plurality of dispensing mechanisms of the type hereinafter described;

Figure 2 represents a plan view of the apparatus shown in Figure 1;

Figure 3 is a side cross-sectional view of one of the dispensing devices shown in the apparatus of Figure 1;

Figure 4 is a plan view of the dispensing device shown in Figure 3;

Figure 5 is a view of another side of the device shown in Figure 3;

Figure 6 is a perspective view of one of the depository or receiving elements associated with the conveyor mechanism shown in Figure 1 and adapted to cooperate with the dispensing elements shown in Figures 3, 4 and 5, in accordance with the invention;

Figure 7 represents a side sectional view of a modified form of the dispensing element shown in Figure 3;

Figure 8 represents an enlarged plan view of the dispensing element shown in Figure 7; and Figure 9 represents a receiving or depository element adapted to be carried by a conveyor system and to cooperate with that portion of the device shown in Figure 7.

Referring to Figures 1 and 2, the apparatus illustrated therein comprises generally a conveyor system A and a pair of dispensing units shown generally at B and C.

The conveyor system comprises a plurality of sprockets 2 and 4 carrying a conveyor chain or belt 6. A corresponding chain or belt 6', as shown in Figure 2, is carried by a similar pair of sprockets on the side opposite sprockets 2 and 4. As shown, the sprocket 4 is affixed to a shaft 8 which is driven through a gear 10 by means of a belt or chain 12, or any other suitable type of driving means, from any suitable source of power, such as an electric motor, not shown.

The dispensing units B, $B_1$ and $B_2$ are mounted above the conveyor system in the manner illustrated in Figures 1 and 2 and supported from suitable supports 14 attached to the frame A, shown with some parts broken away and others omitted. It will be understood that corresponding supports 14 are placed upon each side of the frame but for the sake of clarity only one side of the frame is shown. As will be observed, the particular conveyor system illustrated herein comprises a plurality of laterally disposed rows corresponding to each of the dispensing units B, $B_1$ and $B_2$, each row containing a plurality of cups 16 which are also referred to herein as depository or receiving elements. The cups 16 are attached or affixed to the conveyor belts in any suitable manner so as not to interfere with the operation of the conveyor system, for example, by means of the bolts 18 which pass through the bolt holes 20, shown in Figure 6, and thence through spaced cross bars *a* which are affixed to the upper surfaces of the chains 6 and 6' of the conveyor system. It will be understood that each of the cups 16 may be mounted with respect to the conveyor system in any convenient manner.

Referring in detail to the construction of the dispensing mechanism, particularly with reference to Figures 3, 4, 5 and 6, it will be observed that the cup 16 shown in Figure 6 is provided with a plurality of upwardly projecting elements 22 and 24 disposed on opposite sides of an opening, slot or passage 26. The upwardly projecting elements 22 and 24 are continuations of the end elements 28 and 30, respectively. The cup 16 is also preferably provided with sides 32 and 34. In the bottom of the cup 36 are provided the bolt holes 20, previously referred to, and also preferably an opening 38. The opening 38 is especially desirable in making sandwich cookies, that is to say, cookies or pastries in which a filling or icing is disposed between two wafers. The primary purpose of the opening 38 is to provide a means whereby the filling or icing may drop through the cup 16 in the event the dispensing mechanism for the filling or icing is operated at a time when no wafer or cookie is being carried or conveyed by the cup 16. Heretofore this has always resulted in a substantial loss of icing or filling, while in accordance with the present invention any icing or filling accidentally discharged may be recovered by a suitable receptacle, not shown, placed beneath the filling device and under the conveyor system.

The wafers or other articles to be dispensed are placed in a stack in the holder or container 40 so that the bottom wafer 42 rests on the seating element 44. In the particular embodiment shown in Figures 3, 4 and 5, the container member 40 has an opening 46 at the bottom, except for the seating element 44. The seating element 44 is preferably a strip of sheet metal, for example, spring metal, of substantial width, welded, soldered or otherwise fixed, by means of a vertically projecting portion 48, to the back of the container member 40. The forward end of the seating element 44 is preferably provided with a continuation 50 which gradually slopes in a downward direction, as illustrated in Figure 3, and finally levels off into a horizontal portion 52. The continuation of the seating element 44 is not essential in every instance but is especially desirable in making cookies or fragile pastries where two or more of said cookies or pastries are superposed upon one another. In making such cookies or pastries, commonly referred to as sandwich cookies, the sloping element 50 and the horizontal element 52 provide a means for gently depositing the lower wafer on the cup element 16. Thereafter the filling is applied from an intermediate point, such as the point D shown in Figure 1, and a second wafer is deposited directly on the filling from the second series of dispensing units shown generally at C, C₁ and C₂ in Figure 1.

It will be recognized that the cup or receiving element 16 must be disposed with the bottom 36 thereof a sufficient distance below the lower ends of the container elements shown generally at B and C so that the filled cookie or sandwich clears the bottom of the container element C. Since the conveyor system is preferably arranged so that the cups 16 move in a vertical plane, as shown in Figure 1, along a flattened elliptical path, the first wafer 42 would necessarily drop a substantial distance and might possibly break in some instances if the depositing elements 50 and 52 were omitted. However, in the deposition of the second wafer the distance of fall is substantially less due to the presence in the cup 16 of the first wafer and also of the filling on said wafer. Hence, with respect to the second depositing mechanism, generally shown at C, the elements 50 and 52 are preferably omitted.

A further feature of the invention comprises a means for regulating or controlling the dispensing of the articles, such as wafers contained in the container 40, so that the desired number may be dispensed from the bottom of the stack. This controlling means comprises an adjustable gate or shutter 54 guided by means of a pair of flat guides 56 and 58 affixed to the outside of the container 40, as shown in Figure 5. The control gate 54 is raised and lowered by any suitable means, preferably by means of a rod 60 fastened to the control gate 54 by a rivet, bolt or the like 62, and provided at the upper end with a screw thread 64. The screw threaded portion 64 of the rod 60 passes through a support 66, as shown in Figures 3 and 5, and a readily adjustable nut 68 is provided to support the rod 60 on the support 66. It will be apparent that by merely screwing and unscrewing the nut 68 the gate 54 may be raised and lowered, and in this manner the size of the opening 70 may be changed as to vertical depth so as to permit only a single wafer 42, or in some cases if desired a plurality of wafers, to pass through the opening 70.

The removal of the wafers or other articles from the bottom of the stack in container 40 is effected by the projecting elements 22 and 24 striking against the end 72 of the wafer 42, as shown in Figure 3, and thereby pushing the lowermost wafer 42 through the opening 70 in the lower front part of the container onto the guideway 50. The wafer continues to be supported by the guideway 50 and by the horizontal portion 52 until it reaches the end of the latter, at which point it seats in the bottom of the cup 16. As previously explained, the cup 16 is being carried continuously by conveyor system A, and after receiving the first wafer it passes beneath a filling mechanism of a conventional and well-known type, generally indicated by the arrow at point D of Figure 1, receives a coating of filling and then travels beneath the dispensing element C which is similar in every way to dispensing element B except for the omission of the guide path elements 50 and 52. As the cup 16 travels beneath the depositing mechanism C the elements 22 and 24 engage the lowermost wafer in the stack of wafers held by the dispensing mechanism C and thereby cause said wafer to be deposited on top of the filling, thus forming a complete sandwich cookie. The completed cookie may be removed from the conveyor system in any suitable manner, for example, by a suitable ejecting and stacking mechanism at point E. Or the cookie may be allowed to fall by gravity into a chute or other suitable receiving mechanism at point E. A baffle *b* is provided and is affixed to the adjustable gate 54 in any suitable manner to prevent the cookie or wafer 42 from turning upside down when the machine is operating at relatively high speeds. This is especially desirable with round cookies because of their greater tendency to turn over.

Referring to Figure 5, it will be observed that the lower side portions 74 and 76 of the container 40 serve to act as positioning members to prevent lateral movement of the lowermost wafer or other article in the stack with respect to the remainder of the stack prior to the actual dispensing or depositing operation. The depending sides 74 and 76 also serve as guide means for the dispensing elements 22 and 24. Likewise the seating element 44 serves as a guide means in conjunction with the opening 26. In the particular type of device illustrated it will be understood that both the lower right-hand and left-hand sides of the container 44 must be cut away at points 78 and 80 in order to provide for the passage of the pusher dispenser elements 22 and 24.

One feature of the particular type of device described with reference to Figures 3, 4, 5 and 6 is that the dispensing elements 22 and 24, in conjunction with the opening 26, also act as centering elements in order to center round wafers or other articles in the bottom of the cup 16. This is particularly important in making sandwich cookies because of the necessity for exactly superposing the top cookie on the lower cookie.

Another type of device for depositing wafers or other articles from a stack thereof is illustrated in Figures 7, 8 and 9. This device is generally similar to the preferred type of device described with reference to Figures 3, 4, 5 and 6, except that the cup 82 is provided with a centrally projecting dispensing element 84 instead of a pair of projecting elements 22 and 24 of the type shown in Figure 6. Furthermore, the container or holder 86 is provided with a pair of seating elements 88 and 90 at the bottom thereof instead of a single seating element 44 as described with reference to cup 16. The pair of seating elements 88 and 90, being disposed on opposite sides of the dispensing element 84, act as guideways therefor as the dispensing element 84 traverses the passage 92 during the dispensing operation. During this operation the dispensing element 84 moves through the passage 92 from left to right as viewed in Figure 8.

The means for controlling the dispensing operation so that one cookie is dispensed, or any other predetermined number, is similar to that described with reference to Figures 3, 4 and 5, that is to say, the adjustable gate 94 is raised and lowered by means of a rod 96 fastened to the gate by a rivet or bolt 98 and supported at the upper end by a support 100. The gate itself is guided by means of a pair of guideways 102 and 104, and the upward and downward movement is controlled by screwing and unscrewing a nut 106 on the threaded end 108 of the rod 96.

It will be understood that some changes may be made in the apparatus described without departing from the invention. The apparatus has been described particularly with reference to a machine for making sandwich cookies, but it will be understood that it may also be used in a wrapping machine or in any other type of apparatus where it is desired to superpose a series of articles in a pre-determined relationship.

One of the features of the apparatus described is the provision of a device whereby the manufacture and production of sandwich cookies or the like is greatly facilitated and the amount of production for a given machine is greatly increased. This is made possible by the combined features of the apparatus described and particularly by the fact that the conveyor moves in a closed path in a substantially vertical plane as distinguished for example from a horizontal plane. The greater output or capacity of the machine is made possible by the fact that since the conveyor moves in a vertical plane, a series of holders or stacks of wafers may be disposed transversely or laterally with respect to the path of movement of the conveyor thereby multiplying the resultant output. The arrangement described also makes it possible in making sandwich cookies to place the upper cookie on the lower cookie or wafer without danger of breakage. At the same time, inasmuch as the path of movement of the dispensing and receiving elements does not change but remains on a straight line between the time that the bottom wafer is seated in the dispensing and receiving element and the time that the top wafer is put in place, there is little difficulty with respect to the proper alignment of the wafers in their superposed positions. As already explained, the centering of the wafers is further facilitated by the arrangement of the dispensing elements as described in the preferred type of arrangement shown in Figures 3, 4, 5 and 6.

If the invention is used to stack wafers or other articles in a wrapping machine, it is usually desirable to increase the number of container units. For instance, to stack the so-called "fountain assortments" of crackers, wafers, or the like, instead of using two series of units as generally shown at B and C, anywhere from three to six series or banks of units of three each are placed intermediately between the units B and C, depending upon the number of crackers, wafers, or the like desired in the package. In the containers 40 it is naturally sometimes necessary to enlarge the openings 78 and 80. Furthermore, the dispensing elements 22 and 24 may be made higher or lower. Thus, in stacking cookies or other articles for a wrapping machine these elements are ordinarily higher than in a sandwich machine. The sides 32 and 34 are also proportionately higher, depending upon the number of cookies or other articles being stacked and the height thereof.

Having thus described the invention, what I claim as new and desire to secure by Letters Patent of the United States is:

1. In an apparatus of the character described, a conveyor traveling in a substantially fixed closed path in a vertical plane and including a plurality of spaced transverse bars extending between the sides thereof, a receiving and discharging cup mounted on each of said bars, a holder for a stack of superposed articles positioned above said conveyor having an open bottom, a supporting element partially closing said opening for supporting the stack of articles, and means on said cups for removing the lowermost article of the stack and depositing it in the cup as the conveyor moves beneath said holder, said cups being open at their front ends for discharging said articles upon reaching one end of the conveyor.

2. In an apparatus of the character described, a conveyor travelling in a substantially fixed closed path in a substantially vertical plane and comprising a plurality of individual spaced receiving and discharging elements carried upon the upper surface thereof, a holder for a stack of superposed articles positioned above said conveyor having an opening in the bottom, a substantially centrally positioned stack supporting member partially closing said opening extending in the general direction of travel of said conveyor and adapted to support the lowermost article of the stack, said stack supporting member comprising a flat strip disposed centrally across the bottom part of the holder providing a guideway space on opposite sides thereof for said receiving and discharging elements, the front and rear of the lower portion of said holder with respect to the direction of movement of said conveyor having openings therein, and said receiving and discharging elements being provided with projecting members on opposite sides of the back thereof adapted to move through said rear and front openings of the lower part of said holder in said guideway space and to engage at least the lowermost article of said stack thereby to cause said article to be deposited in said receiving and discharging elements when the latter pass into operative association with said guideway space, said strip extending beyond said holder in the direction of movement of said conveyor and the portion beyond said holder inclining downwardly in a gentle slope whereby when said articles are removed from the bottom of the stack by said projecting members they will be carried downwardly over said slope and deposited gently into the receiving and discharging elements.

3. In an apparatus of the character described, a conveyor travelling in a substantially fixed closed path in a substantially vertical plane and comprising a plurality of individual spaced receiving and discharging elements carried upon the upper surface thereof, each of said receiving and discharging elements being provided with a central aperture in the bottom thereof of substantial size, a holder for a stack of superposed articles positioned above said conveyor having an opening in the bottom, a substantially centrally positioned member partially closing said opening extending in the general direction of travel of said conveyor and adapted to support the lowermost article of the stack and to act as a guideway, the front and rear of the lower portion of said holder with respect to the direction of movement of said conveyor having openings therein, and said receiving and discharging elements being provided with projecting means adapted to move through said front and rear openings of the lower part of said holder and to be guided by said guideway to engage at least the lowermost article of said stack thereby to cause said article to be deposited in said element when the latter passes into operative association with said guideway.

4. In an apparatus of the character described, a conveyor travelling in a substantially fixed closed path in a substantially vertical plane and comprising a plurality of individual spaced receiving and discharging elements carried upon the upper surface thereof, a holder for a stack of superposed articles positioned above said conveyor having an opening in the bottom, stack supporting means partially closing said opening extending in the general direction of travel of said conveyor and adapted to support the lowermost article of the stack and providing a guideway space for said receiving and discharging elements, the front and rear of the lower portion of said holder with respect to the direction of movement of said conveyor having openings therein, and said receiving and discharging elements being provided with projecting means adapted to move through said rear and front openings of the lower part of said holder in said guideway space and to engage at least the lowermost article of said stack thereby to cause said article to be deposited in said receiving and discharging elements when the latter pass into operative association with said guideway space, and means comprising a strip extending beyond said holder from said stack supporting means in the direction of movement of said conveyor and inclining downwardly in a gentle slope whereby when said articles are removed from the bottom of the stack by said projecting means they will be carried downwardly over said slope and deposited gently into the receiving and discharging elements.

ROBERT O. MANSPEAKER.